(12) United States Patent
Svetlik

(10) Patent No.: US 7,401,821 B2
(45) Date of Patent: Jul. 22, 2008

(54) HOLLOWED, DEFORMABLE, RAISED FACE BOLT-RING

(75) Inventor: Harvey E. Svetlik, Grand Prairie, TX (US)

(73) Assignee: Independent Pipe Products, Inc., Dallas, TX (US)

( * ) Notice: Subject to any disclaimer, the term of this patent is extended or adjusted under 35 U.S.C. 154(b) by 414 days.

(21) Appl. No.: 11/229,914

(22) Filed: Sep. 19, 2005

(65) Prior Publication Data

US 2008/0018108 A1 Jan. 24, 2008

(51) Int. Cl.
*F16L 23/00* (2006.01)

(52) U.S. Cl. ............... 285/414; 285/412; 285/368

(58) Field of Classification Search ........... 285/414, 285/415, 413, 412, 368
See application file for complete search history.

(56) References Cited

U.S. PATENT DOCUMENTS

| | | | | |
|---|---|---|---|---|
| 3,135,538 A | * | 6/1964 | George | 285/363 |
| 3,387,867 A | * | 6/1968 | Rogers | 285/336 |
| 3,910,610 A | * | 10/1975 | Turner et al. | 285/337 |
| 4,458,924 A | * | 7/1984 | Schlicht | 285/329 |
| 4,484,771 A | * | 11/1984 | Schulz | 285/368 |
| 4,874,192 A | * | 10/1989 | Key | 285/337 |
| 5,230,540 A | * | 7/1993 | Lewis et al. | 285/363 |
| 5,413,389 A | * | 5/1995 | Schlicht | 285/363 |
| 5,716,083 A | * | 2/1998 | Carr | 285/368 |
| 5,967,566 A | * | 10/1999 | Schlicht | 285/55 |
| 6,361,085 B2 | * | 3/2002 | Nguyen | 285/368 |

* cited by examiner

*Primary Examiner*—David E Bochna
(74) *Attorney, Agent, or Firm*—Charles D. Gunter, Jr.

(57) ABSTRACT

A bolt-ring pipe connector system for connecting stub end pipe particularly thermoplastic pipe is shown. The bolt-ring has an outer vertical rim portion, an inner vertical rim portion and an interconnecting web portion provided with spaced bolt holes. The top side of the bolt-ring has a beveled and angular top surface. The bottom side of the bolt-ring has a contoured recess that provides a variable cross sectional diameter. The new, deformable, variable geometry, hollowed, bolt-ring can be flexed by slight deformations under constant bolt-load. As a result, all anticipated initial and operating changes in high-density polyethylene stub-end dimensions, such as those caused by bolt-up and thermal strain, are managed by the bolt-ring.

9 Claims, 3 Drawing Sheets

HOLLOWED, DEFORMABLE, RAISED FACE BOLT-RING

BACKGROUND OF THE INVENTION

1. Field of the Invention

The present invention relates generally to pipe connector systems which utilize a bolt-ring for the field connection of pipes having a stub end, the bolt-ring being particularly adapted for the interconnection of polyolefin (HDPE) pipe.

2. Description of the Prior Art

There are a variety of pipe coupling and connector systems known in the prior art. Many of the prior art connectors were designed primarily for use in metal (iron or steel) piping systems. Typical applications included such areas as municipal water and sewage systems, chemical and petrochemical pipelines, and the like. Many of these piping systems employed solid metal flange coupling or connector rings. While these connectors worked satisfactorily in many instances, they were more expensive to produce because they were formed as solid metal rings. More recently, the so-called "convoluted" flange connectors have been introduced into the iron and steel pipeline industries. A convoluted flange utilizes a design in which an annular flange member has a U-shaped cross section to provide strength to the flange, which is reduced in weight and material content with resultant cost savings.

For example, U.S. Pat. No. 5,413,389 issued May 9, 1995 and entitled, "Cast Convoluted Piping Flange" describes a piping flange having a convoluted design with a transition in thickness from an outer rim to an inner rim of the flange so as to provide for stress management throughout the cross-sectional geometry. The convoluted design purports to provide the rigidity or stiffness necessary to insure a uniform coupling face for uniform deformation of a gasket or seal, while minimizing the weight of the flange by eliminating unnecessary material.

U.S. Pat. No. 4,458,924 issued Jul. 10, 1984, entitled, "Bimetal Flange Connector", describes a bimetal flange that utilizes a hub of a first metal bonded to a rim of a second metal. The concept of a composite flange of two materials and the use of a recess to reduce weight and optimize stress distribution is described. Again, this connector was designed with a metal piping system in mind.

The convoluted flanges and flange couplers of the type described in the referenced patents have been used successfully in coupling metal pipes in many instances. Furthermore, the technique of computer aided stress analysis in the design of piping flanges has led to further improvements in the configuration of flanges that address the issue of stresses transmitted to the pipe, and in the design and construction of composite material flanges for metal piping systems.

There nevertheless exists a need for improvements in pipe coupling systems where the pipes are formed from thermoplastic materials such as polyethylene or another polyolefin. A popular thermoplastic piping material is high density polyethylene (HDPE). One commercially available system for HDPE piping systems is known in the industry as the "Van-Stone Style Polyethylene Pipe Joint." While these systems have been used successfully for a number of years, the bolt-ring was a solid ring and thus had the disadvantages of weight and cost of manufacture discussed above with respect to the metal piping systems.

There are a number of reasons why a bolt-ring connector which is developed for use with a steel or ductile iron pipe might not be suitable for use with a thermoplastic material, such as polyethylene. Polyethylene is a visco-elastic material which naturally cold-flows under stress over time. The rate of strain is in proportion to stress intensity and time. When a solid steel bolt-ring is used on an HDPE flange and the HDPE thermally expands, the HDPE flange face cold-flows, i.e., is crushed by its own expansion against an immovable, fixed and excessively stiff bolt-ring. Upon cooling, the HDPE flange has typically cold-flowed to a reduced size flange thickness such that leaks can and do occur at the coupling. Upon freezing, the HDPE flange face thins by thermal contraction, the bolt-load is lost, the seal pressure diminishes, and leaks occur. When an HDPE flanged joint is bolted together using solid-metal coupling flange and very-stiff bolt-rings, cold flow of the HDPE stub-end usually occurs fairly quickly, typically within about eight hours. As a result, the contractor will often be forced to come back to the job site the next morning to re-tighten the coupling flange.

Additionally, HDPE exhibits expansion and contraction characteristics which are on the order of ten times those of steel under similar environmental conditions. Because the thermal expansion characteristics of steel are so much less than those of polyethylene, the prior art flange gaskets of the above type have been successfully employed in steel piping systems. HDPE, on the other hand, exhibits much greater expansion and contraction characteristics and also exhibits a "softness" which is about the same as the gasket materials which are used in the steel pipe coupling systems.

It would be advantageous, therefore, to provide an improved bolt-ring for connecting stub end thermoplastic pipe which could be elastically bent by sufficient bolt-load to accommodate the initial and long term cold flow of the polyolefin pipe material.

It would also be advantageous to provide such an improved bolt-ring for thermoplastic pipe which, in the presence of cold flow, would exhibit a residual bolt-ring deformation load sufficiently high to impose a positive pressure seal for the pipe coupling under all operating conditions.

SUMMARY OF THE INVENTION

The improved bolt-ring connector of the invention overcomes the above noted deficiencies associated with solid steel bolt-rings. The bolt-ring of the invention also provides advantages over the known commercially available "convoluted flange" connector systems. The new, deformable, variable geometry, hollowed, bolt-ring can be flexed by slight deformations under constant bolt-load. As a result, all anticipated initial and operating changes in HDPE stub-end dimensions, such as those caused by bolt-up and thermal strain, are managed by the bolt-ring. The result is a more uniform sealing pressure across wide operating circumstances of temperature, operating pressure excursions, and even water-hammer pressure surges.

The bolt-ring of the invention is used for connecting stub end thermoplastic pipe having an end stub with a contact shoulder and an oppositely arranged end face. The bolt-ring is made up of a bolt-ring body having an outer vertical rim portion, an inner vertical rim portion and a web portion interconnecting the outer vertical rim portion and the inner vertical rim portion. The web portion has a plurality of spaced bolt holes therein which circumscribe a centerline of the bolt-ring body. The inner vertical rim portion, outer vertical rim portion and interconnecting web portion together form a bolting-face for the bolt-ring on a top side thereof, the top side of the bolt-ring having a beveled and angular top surface. An opposite bottom side of the bolt-ring includes a contoured recess that reduces the material of the bolt-ring body and provides a variable cross sectional geometry for the bolt-ring body. The inner vertical rim portion includes a thumb region on the bottom side of the bolt-ring which contacts the contact shoulder of the pipe end stub in use. Preferably, the end stub of the stub end pipe has a gasket face for receiving a gasket and the thumb region on the bottom side of the bolt-ring is configured to direct coupling forces to the gasket face.

The plurality of spaced bolt holes provided in the interconnecting web portion each have a centerline which define a circular locus of bolt-hole centerlines. The beveled and angular top surface of the bolt-ring increases in dimension radially outward from the circular locus of bolt-hole centerlines and from the centerline of the bolt-ring body. The beveled and angular top surface also extends between inner and outer joining points on the top surface of the bolt-ring. The inner vertical rim portion is perpendicular to an initial portion of the beveled and angular surface at the inner point of joining and the outer vertical rim portion is perpendicular to the beveled and angular surface at the outer point of joining to the top surface.

Preferably, the thumb portion of the inner vertical rim portion of the bolt-ring is radiussed so as to conform to the curvature of the pipe stub end contact shoulder to centralize and equalize a subsequently applied sealing force. The thumb portion is also slightly radially tapered so that, as an applied bolt-load increases, a tip of the thumb portion contacts the pipe stub end contact shoulder proximate the pipe outer diameter. The beveled and angular top surface of the bolt-ring body is designed to deflect under bolt-loading so as to come into parallelism with the pipe stub end faces to provide uniform and predictable load distribution on the end faces of the stub end and to be deformed by a predictable amount, such that the deformation imposes a spring load on the pipe stub end.

Additional objects, features and advantages will be apparent in the written description which follows.

DETAILED DESCRIPTION OF THE INVENTION

As discussed briefly above, one of the commonly used prior art connecting flanges which has been used on polyethylene pipe is known in the industry as the Van-Stone style swivel bolt-ring. The standard Van-Stone style swivel bolt-rings are typically solid metal and, as a result, are very heavy. The improved bolt-ring of the present invention encompasses a hollow geometry to make the bolt-ring lighter in weight, and thus more economical for end users. The improved design of the invention eliminates the excess metal which would otherwise contribute to bolt-ring stiffness, which stiffness transfers an applied bolt-load to the sealing face of the pipe stub end contact shoulder. The bolt-ring of the invention can be conveniently cast from ductile-iron metal. This preferred cast metal bolt-ring is of variable cross-sectional geometry. It is a monolithic metal casting of variable geometry to provide predicted deformation of the bolt-ring under working load.

Figure 1A:
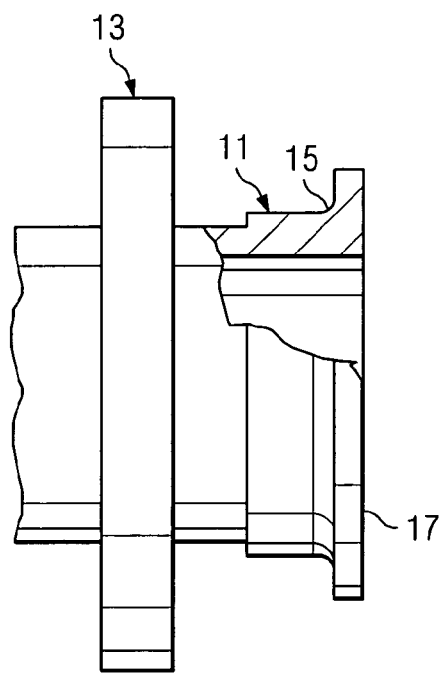
FIG. 1A is a simplified side view of a bolt-ring of the invention being slid into position on the stub end of a length of polyethylene pipe.
Figure 1B:
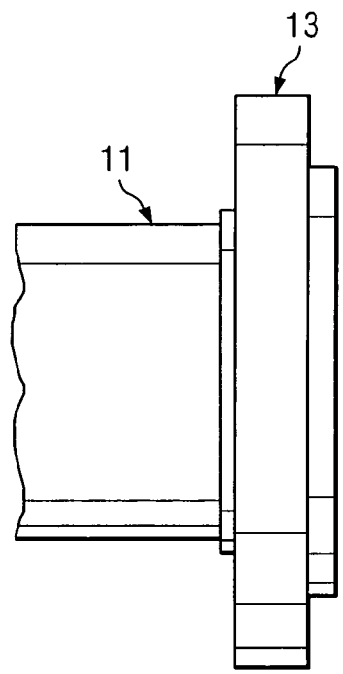
FIG. 1B is a view, similar to FIG. 1, but showing the bolt-ring of the invention in place on the stub end of the pipe.

FIG. 1 is a simplified view of a polyethylene pipe lap-joint stub-end 11 onto which is fitted the bolt-ring 13 of the invention. The pipe end 11 is preferably formed of a thermoplastic material such as a suitable polyethylene, for example HDPE. The stub-end 11 has a contact shoulder 15 and an oppositely arranged end face 17. The contact shoulder 15 forms a gasket receiving face for receiving a suitable sealing gasket. The pipe 11 might be used, for example, in a municipal or water sewage system.

Figure 5:
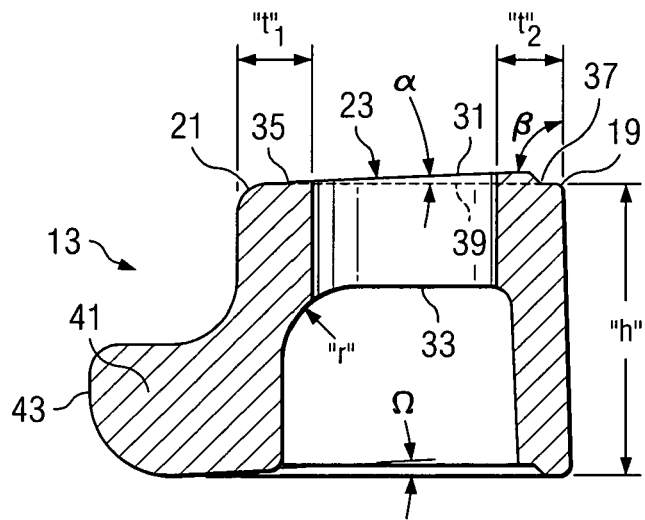
FIG. 5 is a cross sectional view of the bolt-ring of the invention taken along lines V-V in FIG. 3.
Figure 6:
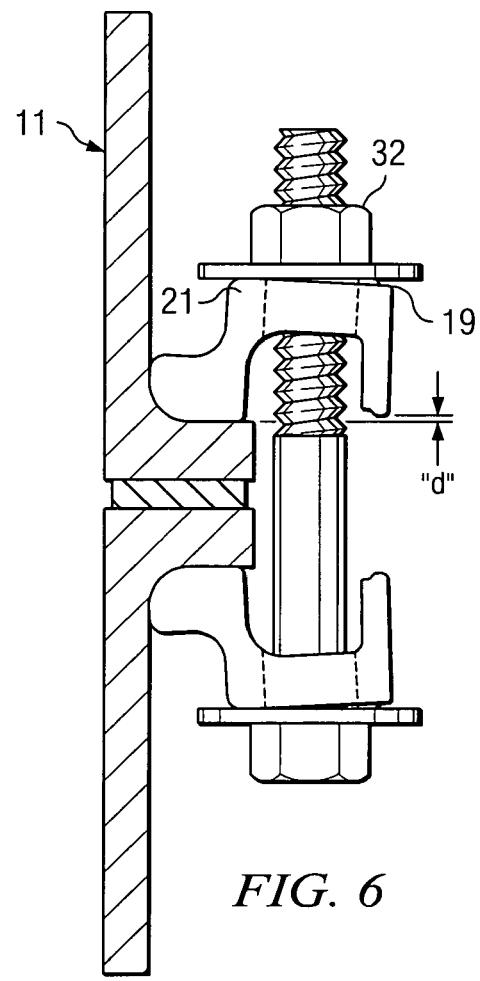
FIG. 6 is an assembly view of the bolt-ring assembly of the invention in place on the stub end of a polyethylene pipe.

As shown in the sectional view of FIG. 5, the bolt-ring 13 has an outer vertical rim 19, an inner vertical rim 21 and a web portion 23 interconnecting the outer vertical rim portion 19 and the inner vertical portion 21. The inner and outer vertical rim portions 19, 21 are shown as being approximately equal in length in FIG. 5. In other words, the overall height "h" of the outer vertical rim 19 is approximately equal to the overall height of the inner vertical rim 21. However, in one embodiment of the invention, the overall height of the outer vertical rim 19 is specifically designed to be shorter in length than the overall height of the inner vertical rim 21. With reference to FIG. 6, the outer vertical rim 19 is shorter than the inner vertical rim 21 by the distance "d."

Figure 3:
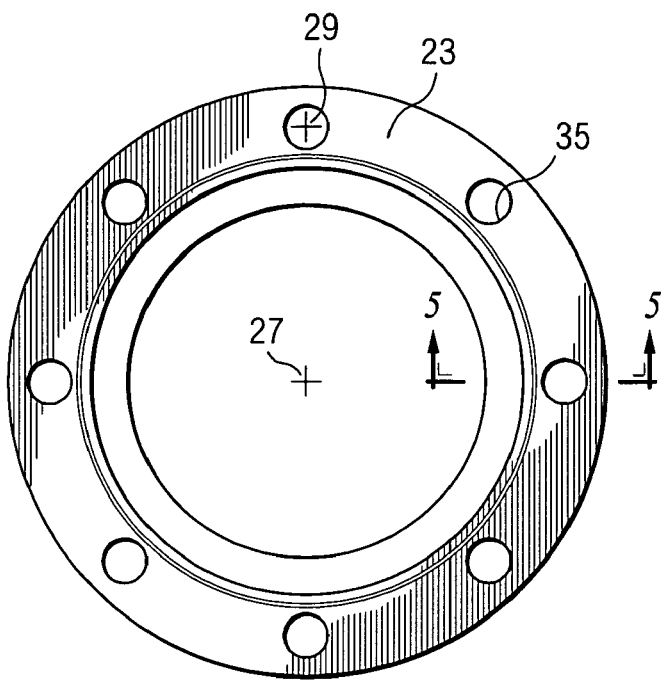
FIG. 3 is a top view of the improved bolt-ring of the invention.
Figure 4:
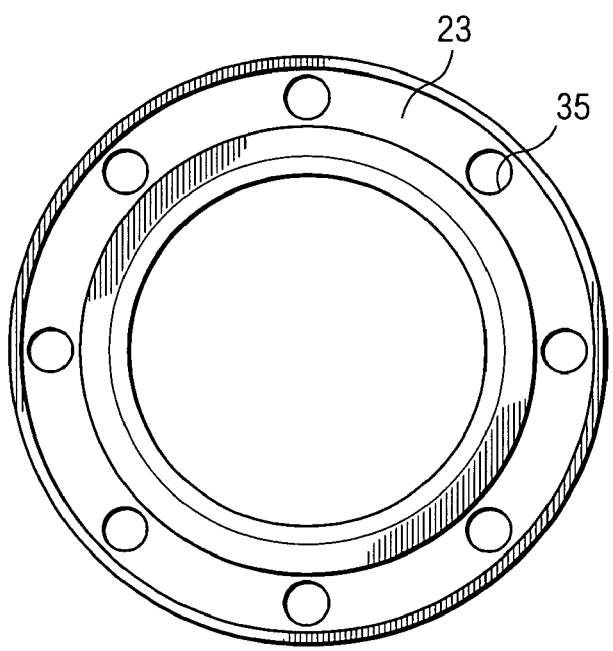
FIG. 4 is a bottom view of the bolt-ring of FIG. 3.

As shown in FIGS. 3 and 4, the web portion 23 has a plurality of spaced bolt holds 35 which circumscribe a centerline 27 of the bolt-ring body. Each of the bolt holes 35 provided in the interconnecting web portion 23 also has a centerline, such as centerline 39 in FIG. 3. The bolt hole centerlines 29 define a circular locus of bolt hole centerlines, indicated generally by the dotted line in FIGS. 3 and 4. In the embodiment shown in FIGS. 3 and 4, the bolt-ring body has eight evenly spaced bolt holes 35. However, the number and diameter of the holes could vary. The number of bolt-holes through the beveled top surface of the bolt-ring is in compliance with the standard number of bolts and hole diameters as specified in ASME/ANSI B16.5, ANSI B16.1, and AWWA C207 Class 150 for bolt patterns and hole diameters. The bolt-ring can be swivelled to align with other bolting components without regard for the initial alignment of the bolt holes.

As shown in FIG. 5, the inner vertical rim portion 19, the outer vertical rim portion 21 and the interconnecting web portion 23 together form a bolting-face for the bolt-ring on a top side 31 thereof. The top side 31 of the of the bolt-ring has a beveled and angular top surface. An opposite bottom side 33 of the bolt-ring includes a contoured recess that reduces the material of the bolt-ring body and provides a variable cross-sectional geometry. Applicant's design uses a sufficiently large radius adjacent to the underside of the top surface and radially outer surface of the inner vertical rim, to enable complete flow-filling, without voids, of the sand-mold cavity, during the casting of molten ductile-iron metal into the sand mold.

As shown in FIG. 5, the beveled and angular top surface 31 of the bolt-ring increases in dimension radially outward from the circular locus of the bolt hole centerlines (29 in FIG. 3) and from the centerline of the bolt-ring body (27 in FIG. 3). The beveled and angular top surface 31 can also be seen to extend between an inner joining point 35 and an outer joining point 37 on the top surface 31 of the bolt-ring. The inner vertical rim portion 21 can be seen to be perpendicular to an initial portion of the beveled and angular top surface 31 starting at about the inner joining point 35 and the outer vertical rim portion 19 can be seen to be perpendicular to the beveled and angular surface 31 at the outer joining point 37 of the top surface 31. In other words, the web portion 23 of the bolt-ring body is generally rectangular in cross section with the angular top surface 31 presenting a slight taper which increases from left to right as viewed in FIG. 5. The included angle "∝" located between the top surface 31 and an imaginary line 39 drawn in the plane of the joining points 35, 37 is approximately 2° in the embodiment of the ring shown in FIG. 5. The angle "β" in FIG. 5 is approximately 90°, giving the outer wall of the rim 19 a somewhat "inclined" aspect.

The top surface 31 becomes thicker, increasing in dimension, as the radial distance from the bolt-ring center 27 also increases. The top surface thickness transitionally increases from its inner radial portion to its outer radial portion, so as to provide spring stiffness when deformed, such that the Van-Stone lap-joint polyethylene stub-ends maintain a minimum seal load on the seal faces under all tolerable thermal-strain conditions.

The beveled and angular top surface 31 is the surface against which the connecting bolt-nut initially rests. As the nut (32 in FIG. 6) is tightened, the bolt tensile stress deforms the bolt-ring 13 so as to bring the top surface 31 flat and in parallel with the nut's bottom, and perpendicular to the axis of the bolt itself. As a result, the stress-load in compression on the interface between the nut and top-surface of the bolt-ring is uniform, i.e., there is virtually no high intensity corner or edge loading of the nut on bolt-ring top surface that could be degraded by rust over time.

The degree of the angle "∝" located between the top surface 31 and an imaginary line 39 is designed to deflect under bolt-load so as to come into virtual parallelism with the polyethylene pipe's lap-joint stub-end faces 17 so as to provide uniform and predictable load distribution on the face of the pipe stub-end; and, to be deformed by a predictable amount, such that the deformation imposes a disk "spring load" on the HDPE pipe's lap-joint stub-end, so as to accommodate the very high thermal-strain (expansion and contraction) of the polyethylene material in the stub-end face. The resulting connector assembly provides a more reliable sealing joint for a polyethylene Van-Stone style lap-joint connection because of the residual spring-load sealing force retained by the elastic deformation of the hollowed bolt-ring. Solid Van-Stone bolt-rings are more rigid and do not exhibit this spring-load effect to the same degree achieved by the present design. The improved bolt-ring of the invention provides a balance of adequate stiffness to transfer bolt-load into sealing pressure, while at the same time, providing a suitable degree of elastic deformation that maintains the polyethylene Van-Stone style lap-joint sealing face pressure above a lower threshold sealing pressure limit.

The inner rim vertical portion 21 and the outer rim vertical portion 19 are of generally constant wall thickness, indicated as "$t_1$" and $t_2$" in FIG. 5, within the tolerances allowable by sand casting methods. There is a sufficiently large radius "r" (in FIG. 5) on the bolt-ring bottom side 33 and radially outer surface of the inner vertical rim portion 21 to enable complete flow filling of a sand mold during casting. The beveled and angular top surface 31 is designed to deflect under bolt-loading so as to come into parallelism with the pipe stub end faces 17 to provide uniform and predictable load distribution on the end faces 17 of the stub end 11 and to be deformed by a predictable amount, such that the deformation imposes a spring load on the pipe stub end 11.

Figure 2:
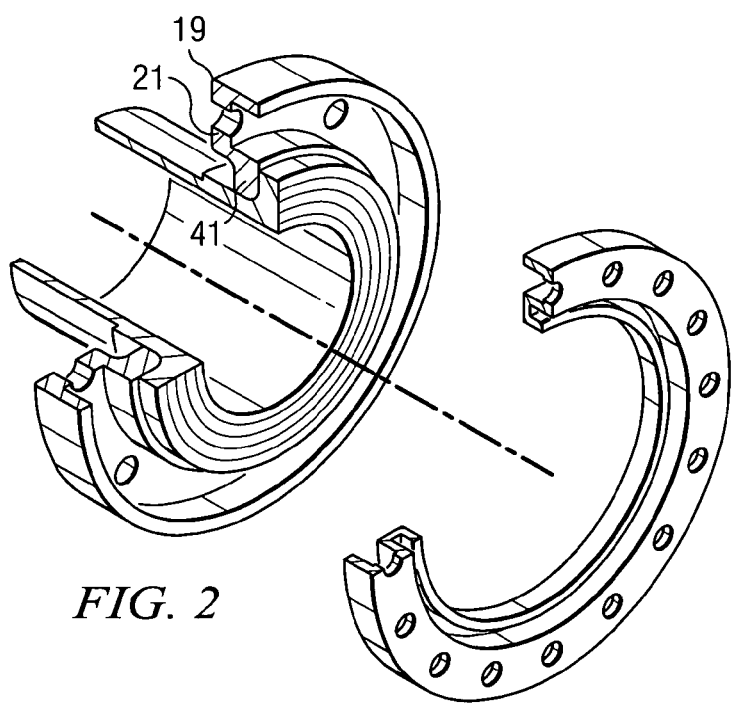
FIG. 2 is an exploded view of the bolt-ring system of the invention.

The inner vertical rim portion 21 also includes thumb portion 41 on the bottom side of the bolt-ring which contacts the contact shoulder 15 of the pipe end stub in use 11. The integral thumb portion is cast into the lower portion of the inner vertical rim portion 21. This thumb portion does not necessarily include a "hub" as did certain of the prior art designs. In the prior art, the "hubs" were intended to enable connection and attachment of the bolt-ring to metal pipe by means of soldering, brazing or heliarc-welding. While the geometry of the thumb portion of the bolt-ring of the invention may take various forms, there is no "hub" in the prior art sense of being used for the purpose of welding, attaching, or otherwise connecting the ductile-iron bolt-ring to the OD surface of the polyethylene plastic pipe. As can be seen in FIG. 2, the thumb portion 41 of the inner vertical rim 21 of the bolt-ring is radiussed so as to conform to the curvature of the pipe stub end contact shoulder 15 to centralize and equalize a subsequently applied sealing force. The thumb portion is preferably slightly radially tapered so that, as an applied bolt-load increases, a tip 43 of the thumb portion 41 contacts the pipe stub end contact shoulder 15 proximate the pipe outer diameter.

The design of Applicant's thumb portion is significant in several respects. The "center point" of the applied bolt-load is applied closer to the inner portion of the polyethylene Van-Stone style joint such that a more even sealing pressure is impressed over a broader area providing a more uniform seal pressure over a larger area. The prior art designs allowed disk-plate rotation of the metal ring's "thumb" towards the radially outer edge of the polyethylene stub-end sealing face, such that very little sealing pressure was obtained at the ID of the sealing interface. In fact, it is known, that in many cases of the prior art designs, the Van-Stone style lap-joint had no sealing at the ID, such that the bolts had to be over tightened to force a seal at the extreme outer edge of the polyethylene stub-end sealing interface. Applicant's design constitutes a major improvement over prior art. The "thumb" of the new bolt-ring is radiussed so as to conform to the curvature of the polyethylene pipe lap-joint stub-end, so as to promote concentricity, centralization and equalized and uniform sealing force. The thumb is also slightly radially tapered (note the 2° angle "Ω" in FIG. 5) so that as the bolt-load increases, the tip of the thumb contacts the plastic polyethylene pipe stub-end very close to the pipe OD. The center-point of pressure occurs closer to the pipe OD, with the result being that the initial bolt-load is transferred to that point at first contact. As the bolt-load is increased by bolt-torque, the tip of the thumb indents the back face of the polyethylene pipe lap-joint stub-end by compressive load, initiating the sealing force on a circle almost adjacent to the pipe OD. As the bolt-load further increases, the thumb elastically bends and deforms and is brought into parallelism with the back end face 17 of the HDPE stub-end such that the center point of load remains closer to the pipe OD, versus the prior art designs. In the prior art designs, the flat "thumb" rotated out of parallelism, and the center-point of pressure moved outwardly towards the outer edge of the HDPE lap-joint stub-end, such that there was little sealing pressure on the ID of the HDPE lap-joint stub-end, and the majority of the bolt-load was concentrated towards the outer edge of the HDPE lap-joint stub-end. Applicant's improved bolt-ring design remedies these deficiencies.

Applicant's thumb portion, specifically that portion which is located radially innermost against the crotch of the lap-joint HDPE stub-end, may be limited in length by the bolt-pattern and the pipe OD. In such a case, the thumb can be provided as a sold mass joined to the inner vertical rim geometry. Alternately, when the bolt-pattern and pipe OD allow, the thumb portion can be provided with an increased length. In order to encourage uniform sealing pressure on the lap-joint HDPE stub-end, Applicant's design preferably uses a longer deformable thumb of variable cross-section that is more easily, uniformly and elastically deformed under bolt-load so as to apply uniform sealing pressure on the HDPE pipe stub-end.

Preferably, the bottom side 33 of one bolt-ring is contoured to mate with the top side 31 of a mating bolt-ring, whereby the bolt-rings are stackable for storage or shipment 8. The improved bolt-ring design thus incorporates a stacking feature such that when multiple rings are stacked and shipped, they "nest", and thus resist horizontal sliding so as to remain in a stacked configuration. Typical prior art bolt-ring designs were subject to horizontal sliding when one or more of the prior art bolt-rings were being slid off of a stack of shipped rings. As a result, injuries to worker's legs and feet could occur more easily. While only one form of "nesting" features is illustrated in the drawings, those skilled in the art will appreciate that other convenient nesting designs could be utilized, as well.

An invention has been provided with several advantages. The improved bolt-ring of the invention is specifically designed to be used in Van-Stone style lap-joint HDPE stub end pipe. The improved bolt-rings are lighter in weight and more economical to produce. The variable cross sectional geometry of the design provides a predetermined and predictable deformation of the bolt-ring under working loads. The result is more uniform and predictable load distribution on the end faces of the pipe stub end. The controlled deformation also imposes a spring load on the pipe stub end which accommodates thermal strain in the polyethylene material of the pipe. The result is a more reliable sealing joint for HDPE stub end pipe. There are other advantages of the invention discussed above with respect to the various details of the design and which will be appreciated by those skilled in the relevant art.

While the invention has been shown in only one of its forms, it is not thus limited but is susceptible to various changes and modifications without departing from the spirit thereof.

What is claimed is:

1. A bolt-ring for connecting stub end thermoplastic pipe having an end stub with a contact shoulder and an oppositely arranged end face, the bolt-ring comprising:
   a bolt-ring body having an outer vertical rim portion, an inner vertical rim portion and a web portion interconnecting the outer vertical rim portion and the inner vertical rim portion, the web portion having a plurality of spaced bolt holes therein which circumscribe a centerline of the bolt-ring body;
   the inner vertical rim portion, outer vertical rim portion and interconnecting web portion together forming a bolting-face for the bolt-ring on a top side thereof, the top side of the bolt-ring having a beveled and angular top surface, and wherein an opposite bottom side of the bolt-ring includes a contoured recess that reduces the material of the bolt-ring body and provides a variable cross sectional geometry;
   wherein the inner vertical rim portion includes a thumb region on the bottom side of the bolt-ring which contacts the contact shoulder of the pipe end stub in use, the thumb region including a bottom surface which is radially tapered so that it presents a beveled and angular bottom surface for the bolt-ring;
   wherein the plurality of spaced bolt holes provided in the interconnecting web portion each have a centerline which define a circular locus of bolt-hole centerlines, and wherein the beveled and angular top surface of the bolt-ring increases in dimension radially outward from the circular locus of bolt-hole centerlines and from the centerline of the bolt-ring body; and
   wherein the beveled and angular top surface, together with the beveled and angular bottom surface of the bolt-ring cause the bolt-ring to deflect under bolt-loading so as to come into parallelism with the pipe stub end faces to provide uniform and predictable load distribution on the end faces of the stub end and to be deformed by a predictable amount, such that the deformation imposes a spring load on the pipe stub end.

2. The bolt-ring of claim 1, wherein the end stub of the stub end pipe has a gasket face for receiving a gasket and the thumb region on the bottom side of the bolt-ring is configured to direct coupling forces to the gasket face.

3. The bolt-ring of claim 1, wherein the outer vertical rim and the inner vertical rim both have an overall height, and wherein the overall height of the outer vertical rim is approximately equal to the overall vertical height of the inner vertical rim.

4. The bolt-ring of claim 1, wherein the outer vertical rim and the inner vertical rim both have an overall height, and wherein the overall height of the outer vertical rim is less than the overall vertical height of the inner vertical rim.

5. The bolt-ring of claim 1, wherein the beveled and angular top surface extends between inner and outer joining points on the top surface of the bolt-ring, and wherein the inner vertical rim portion is perpendicular to an initial portion of the beveled and angular surface at the inner point of joining and the outer vertical rim portion is perpendicular to the beveled and angular surface at the outer point of joining to the top surface.

6. The bolt-ring of claim 5, wherein the thumb portion of the inner vertical rim portion of the bolt-ring is radiussed so as to conform to the curvature of the pipe stub end contact shoulder to centralize and equalize a subsequently applied sealing force, the thumb portion also being slightly radially tapered so that, as an applied bolt-load increases, a tip of the thumb portion contacts the pipe stub end contact shoulder proximate the pipe outer diameter.

7. The bolt-ring of claim 6, wherein the bottom side of one bolt-ring is contoured to mate with the top side of a mating bolt-ring, whereby the bolt-rings are stackable.

8. The bolt-ring of claim 7, wherein the inner vertical rim portion and the outer vertical rim portion are of constant wall thickness within the tolerances allowable by sand casting methods.

9. The bolt-ring of claim 8, wherein a sufficiently large radius is provided on the bolt-ring bottom side and radially outer surface of the inner vertical rim portion to enable complete flow-filling of a sand mold during casting.

\* \* \* \* \*